(12) United States Patent
Römer et al.

(10) Patent No.: US 6,889,527 B1
(45) Date of Patent: May 10, 2005

(54) SKULL POT FOR MELTING OR REFINING INORGANIC SUBSTANCES, ESPECIALLY GLASSES AND GLASS CERAMICS

(75) Inventors: Hildegard Römer, Korben (DE); Uwe Kolberg, Mainz-Kastel (DE); Guido Räke, Bingen (DE)

(73) Assignee: Schott Glas, Mainz (DE)

(*) Notice: Subject to any disclaimer, the term of this patent is extended or adjusted under 35 U.S.C. 154(b) by 3 days.

(21) Appl. No.: 10/049,952

(22) PCT Filed: Aug. 16, 2000

(86) PCT No.: PCT/EP00/07987

§ 371 (c)(1),
(2), (4) Date: Jun. 4, 2002

(87) PCT Pub. No.: WO01/14268

PCT Pub. Date: Mar. 1, 2001

(30) Foreign Application Priority Data

Aug. 21, 1999 (DE) ................................ 199 39 781

(51) Int. Cl.[7] ................................................ C03B 5/00
(52) U.S. Cl. ............................ 65/347; 65/346; 65/355; 65/356; 65/326; 65/327; 373/30; 373/27
(58) Field of Search .......................... 65/347, 346, 356, 65/355, 326, 327; 373/30, 27

(56) References Cited

U.S. PATENT DOCUMENTS

| | | | |
|---|---|---|---|
| 4,471,488 A | 9/1984 | Reboux | 373/153 |
| 4,687,646 A | 8/1987 | Mateika et al. | 422/248 |
| 5,112,378 A | 5/1992 | Weisenburger et al. | 65/327 |
| 5,367,532 A | 11/1994 | Boen et al. | 373/156 |
| 5,567,218 A * | 10/1996 | Ladirat et al. | 65/327 |
| 6,058,741 A | 5/2000 | Sobolev et al. | 65/335 |

FOREIGN PATENT DOCUMENTS

| | | |
|---|---|---|
| DE | 33 16 546 | 4/1984 |
| EP | 0 079 266 | 5/1983 |
| EP | 0 167 316 | 1/1986 |

(Continued)

OTHER PUBLICATIONS

Moulin, J. et al.: "Nouveaux developpements dans la fusion electrique des verre refractaires" Bd. 26, Nr. Jul. 4-5, 1972 Oct. 1972, pp. 123-127.

(Continued)

*Primary Examiner*—Mark Halpern
(74) *Attorney, Agent, or Firm*—Baker & Daniels

(57) ABSTRACT

The invention relates to a skull pot (1) for melting, crystallizing or refining inorganic substances. Said pot comprises a pot wall (1.1), a pot bottom (1.2), an induction coil (2) which surrounds the pot wall (1.1) and by means of which high-frequency energy can be coupled into the content of the pot. The pot wall (1.1) is formed by a ring of metal pipes which can be connected to a cooling medium. Slits are embodied between adjacent metal pipes. The bottom (1.2) is provided with a discharge for the melt (3). A sleeve (4) is allocated to the discharge. The admission end (4.1) of the sleeve (4) protrudes far into the inner chamber of the skull pot (1) in such a way that, during use, the melt (3) can be withdrawn through the crystallized bottom layer (3.3) in a controlled manner without the danger of impairing quality.

18 Claims, 1 Drawing Sheet

FOREIGN PATENT DOCUMENTS

| | | |
|---|---|---|
| EP | 0 176 898 | 4/1986 |
| EP | 40 05 746 | 8/1991 |
| EP | 0 622 140 | 11/1994 |
| EP | 0 627 388 | 12/1994 |
| EP | 0 528 025 | 6/1996 |
| FR | 2768257 | 3/1999 |
| WO | WO 92/15531 | 9/1992 |
| WO | WO 98/05185 | 2/1998 |

OTHER PUBLICATIONS

Lifanov E.A. et al.: "A Crucible-typed Induction Furnace for Melting Glass" Glass and Ceramics, US, Consultants Bureau, Bd 48, Nr. 7, Jul. 1, 1991, pp. 288-290.

* cited by examiner

SKULL POT FOR MELTING OR REFINING INORGANIC SUBSTANCES, ESPECIALLY GLASSES AND GLASS CERAMICS

The present invention relates to a so-called skull crucible for melting or refining inorganic substances, in particular glasses and glass ceramics.

Such crucibles comprise a crucible wall which is generally cylindrical and is made up of a crown of vertical metal tubes, with slots between adjacent tubes. The crucible base may be composed of metal tubes, yet it can also comprise fireproof material. Said tubes are connected at their ends to vertical tubes for supplying or draining off coolant.

Heating is effected by an induction coil surrounding the wall and via which high frequency energy is coupled to contents of the crucible.

A skull crucible for melting inorganic substances is disclosed in EP 0 528 025 B1, for example.

A skull crucible functions as follows: the crucible is filled with heterogeneous mixture or flakes or a mixture hereof. The glass or the melt must first be preheated to obtain a certain minimum conductivity. Preheating often occurs by burner heating. If the coupling temperature is reached more energy can be supplied by irradiation of high-frequency energy. During operation also the melt can be heated additionally for heating by means of high-frequency energy via burners which have an effect on the melt from above, or via hot waste gases.

During operation an edge layer of solidified melt forms on the cooled crucible wall comprising metal pipes. A layer of crystalline material is advantageous here which has better heat insulation as compared to a vitreous layer. The edge layer protects the crucible wall from corrosion by aggressive or hot melts. This cold edge layer is vitreous or crystalline depending on glass melt.

The base layer is also cold, since the base is likewise cooled, similarly to the peripheral walls, where a vitreous or crystallised cold base layer also forms. This is a disadvantage for pouring out the melt via a base run-off. To let the melt run out through the base run-off, the solidified base layer must be loosened either by being knocked or dissolved thermally by means of additional heating units. The resulting effect of such a crystalline layer for the melt flowing past is a nucleating agent, and this is undesirable. In addition, the HF field is weaker in the base region, as the coil terminates ca. 2–5 cm above the base.

The high-frequency energy can be utilised only for heating the interior of the skull crucible. On the other hand it cannot be employed for specific heating of the cooled base region. If the aim were to heat the layers close to the base using induction heating, then heat would be drawn from these layers again by cooling of the base. This would culminate in impoverishment of the energy introduced, compared to the uncooled hot middle zone of the melt.

It might also be conceivable to increase the high-frequency energy overall so that the temperature of the base region exceeds the upper devitrification temperature. In that case the problem of decanting would have to be overcome. But the melt in the central region of the skull crucible would then be superheated. This could lead to synthesis by selective vaporising being displaced, resulting in fluctuations in refractivity and lubricating.

There is little literature on special techniques of the discharge of glass melt from a skull crucible. In general a run-off opening is illustrated diagrammatically only. U.S. Pat. No. 5,567,218 describes an outlet opening which is cooled only slightly and is relatively large, and to which a well cooled slide is assigned. At the same time a short ceramic sleeve projects into the melt whose sole task is to thermally insulate the run-off area to facilitate run-off. This reference also makes mention of variants with indirect heated discharge feeders.

Were these embodiments which are insensitive to crystallisation or slightly sensitive adequate for such melting, then their disadvantage is that the meltings contain a large number of crystals and streaking after run-off. With optical crystallisation-sensitive melting crystals form during such run-off on the abovementioned ceramic sleeve. These impair removal of the melt from the base region. They also disallow controlled discharge. The discharge rate cannot be especially well controlled. In the case of aggressive glasses there is the added risk that the ceramic sleeve is rapidly melted and that the dissolution products cause flaws in the glass.

The object of the present invention is to provide a skull crucible of the type initially described, such that also with problematic glass types the melt can be discharged from the base region in a controlled fashion, without impairment of the glass quality, particularly with aggressive or qualitatively high-quality glasses.

This task is solved by the characteristics of claim 1. The inventors have recognised that there is the possibility of trouble-free removal of the melt if measures are put in place to remove melt from the hotter zones only. The cold, crystallised glass of the base region is therefore not to be removed according to the invention.

This ensures that no crystalline material from the base region reaches the ingots, that during the casting process the melt does not pass by the crystallised base layer and accordingly new nuclei constantly do not form and get carried along and that devitrification products of higher density than the glass melt itself, which are deposited in the base region, is not drawn into the ingot. Also, the run-off sleeve can be of such a diameter and length corresponding to viscosity of the melt that a laminar discharge of the melt without turbulence in the mould is ensured. This technique can be used to manufacture crystal-free and streak-free ingots from optical glass.

The invention offers another advantage: with discontinuous crucible melting no stoppage of the glass flow is necessary; rather the glass flow stops itself, as a result of intelligent height selection of the sleeve. The residual gas remaining in the crucible ensures further HF coupling.

Accordingly, the process can immediately be continued. At the same time new heterogeneous mixture can be replenished without renewed processing by way of additional heating, for example by means of a burner flame.

This is a particular advantage with glass types of minimal conducting capacity, which are difficult to connect, as well as with glass types having readily volatile batch constituents which vaporise or atomise strongly when burner heating is employed.

Two platinum variants were tested as embodiments. Common to both variants is the fact that the discharge pipe and the sleeve comprise platinum or a platinum alloy and the discharge pipe is fitted with a 50 Hz resistance heating unit. Platinum is used accordingly because it is stable under oxidising conditions up to 1600° C. and barely causes traces of discoloration in the glass. For higher temperatures sleeves made of iridium, molybdenum and wolfram or compounds of these materials are suitable.

According to a first variant the run-off pipe ideally has a height of ca a third of the overall melt level, if at the same time it is to be ensured that coupling is also to be guaranteed during and after casting. If there is not this requirement then due to contamination of the melt by the material of the platinum sleeve it is more favourable to have the sleeve considerably shorter. Sleeves of 2 to 6 cm long have proven suitable for this. The glass seal between platinum flange and water-cooled skull crucible is ensured by a quartz plate as well as ring air cooling around the platinum flange. According to melt and corrosion requirements the quartz ware plate is between 1 and 2 cm thick. And in all cases the platinum sleeve must project at least 1 cm above the quartz ware plate.

In the second variant the structure for extreme demands on platinum freedom was further optimised. In this case the platinum sleeve is cooled with air during melting and refining. This ensures that during these melting phases the platinum is separated by a solid glass layer from the melt and no dissolving can take place. Just before the casting phase cooling is reduced or turned off completely and the glass on the platinum sleeve is heated to a temperature above the devitrification limit. When all crystals in the vicinity of the discharge are dissolved the 50 Hz resistance heating of the platinum pipe is raised to casting temperature and the melt is removed. When the glass limiting layer is dissolved the temperature can be determined by measuring it using a thermoelement attached to the sleeve.

The thermoelement is withdrawn via the gas outlet from the cooled sleeve and conveyed via feedthrough capacitors to a measuring unit. The feedthrough capacitors assist in filtering or smoothing possible HF interference signals.

The platinum run-off sleeve could on principal also have contact with the water-cooled skull crucible from an electrical layer. But this variant does have drawbacks relative to cooling, as in this case the platinum run-off is influenced by the water cooling of the skull crucible and thus there is the danger of excessive cooling in the vicinity of the run-off sleeve. For very aggressive glass melting this variant can be advantageous though, since in this case the problem of glass sealing between skull and platinum run-off sleeve does not apply.

Electrical uncoupling of flange and metallic skull crucible is desirable whenever glass sealing is not problematic. This leads to a lower HF interference level on Pt heating. In the event of electrical uncoupling of flange and metallic skull crucible there must be a distance of at least 0.5 cm between both components, which is filled with electrically insulating ceramic. The best material here is quartz ware.

Another conceivable run-off variant would be a quartz glass pipe which projects a few centimeters into the melt in the upper region and is heated indirectly below the crucible base. The advantage to this variant is absolute platinum freedom of the melt. The drawback is the limited stability of the run-off in particular due to corrosion by aggressive glass melting.

Embodiment

A glass from the Lanthan Krone family was melted and cast. The HF energy is supplied via a generator with a frequency of 1 MHz. The melt volume is ca. 8 l. The melt level in the skull crucible was 21 cm. The HF energy required for casting is 30 kW. The upper devitrification temperature of the glass is ca. 1040° C. The casting temperature is 1100° C. At this target temperature the temperatures in the centre of the crucible between base, middle and surface fluctuate between 1000° C. at the base, 1150° C. in the middle and 1100° C. in the vicinity of the melt surface. This means that a crystal layer, which due to the sleeve construction does not have an adverse affect, is on the base during casting.

A platinum run-off pipe 50 cm in length, a pipe diameter of 8 mm and a fitted sleeve 10 mm in diameter and 7 cm sleeve length were used. The platinum tube has a flange mounted in the region of the crucible base, which is set directly on the alumosilicate base plate of the skull crucible and which assists in attaching the heat circuit. The distance between flange and water-cooled skull crucible is 5 mm. The flange edge at the top is air-cooled. In the case of highly corrosive glass melting or high refining temperatures the switch can be made from air cooling to water cooling, as required. Located at the lower end of the platinum pipe is another plate lug for laying on power to heat the flange. The platinum flange can be heated by means of a heating circuit between flange and plate lug to temperatures up to a maximum of 1400° C. Only the pipe itself is heated, whereas the sleeve projecting into the glass is heated only indirectly by thermal conduction from the platinum tube and from the hot melt.

During melting and refining the platinum run-off pipe is unheated. Around 1 to 2 hours prior to casting the crucible is set to casting temperature and the platinum flange is also slowly brought up to casting temperature. When the target temperature is reached both for the melt and the run-off the glass warms up.

When the air-cooled sleeve is used the air cooling on the sleeve is turned off to additionally adjust the target temperature oh the pipe and in the melt for casting. The glass is held back by a stopper at the warm-up stage, until all target temperatures have been reached and the temperature on the sleeve is above 1050° C., thus clearly above the upper devitrification limit.

The invention is now explained in greater detail with reference to the diagram, in which.

Figure 1:
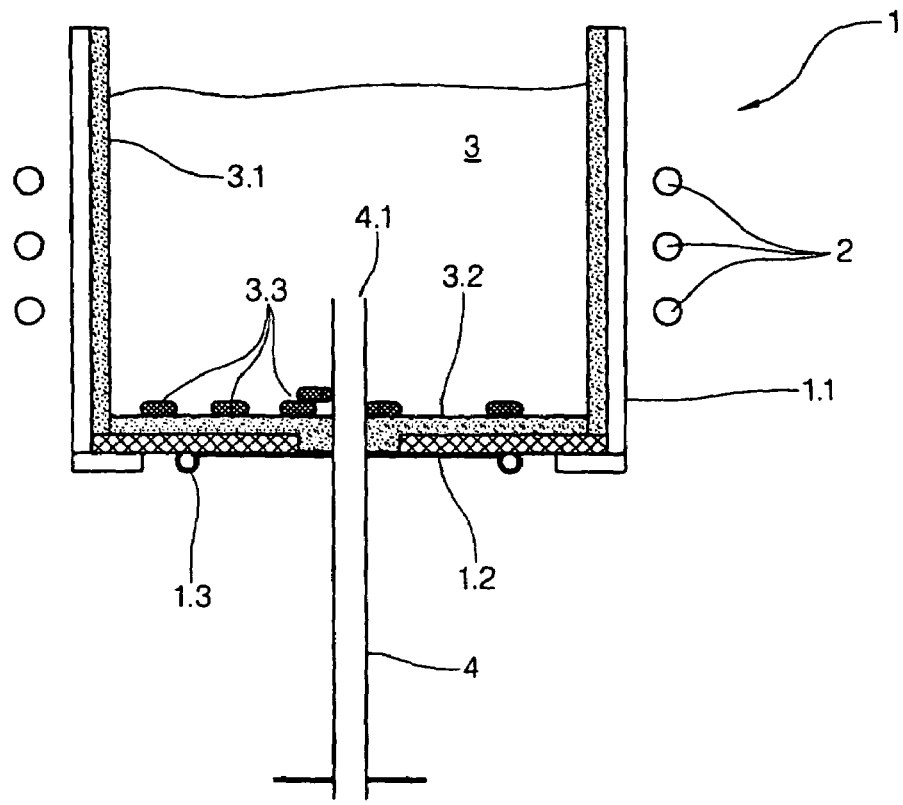
FIG. 1 illustrates a skull crucible according to the first variant in diagrammatic vertical section.

The skull crucible 1 illustrated in the figures serves to melt or refine inorganic substances, in particular glass or glass ceramic, and especially broken glass or so-called heterogeneous mixtures or both.

The skull crucible has a wall 1.1, formed by a crown of vertical metal pipes which are conductively connected to one another and are attached to a coolant, such as water.

The base 1.2 of the skull crucible 1.1 is constructed from a quartz ware plate. It, too, is cooled, especially by air exiting from pipes 1.3.

The wall 1.1 is enclosed by an induction coil 2. This is a component of a high-frequency facility, with which high-frequency energy is supplied to the contents of the skull crucible.

As can be seen, a melt 3 is inside the skull crucible. The wall 1.1 and the base 1.2 of the skull crucible 1.1 are each covered by a crystallised layer 3.1, 3.2. Coring products 3.3 are illustrated schematically in the base region. These can form in certain glass types, and sink down to the base from the interior of the melt.

According to the invention a platinum sleeve 4 is provided as run-off. The upper edge 4.1 of the sleeve 4 clearly projects out over the upper edge of the base 1.2. The upper edge is located in a zone lying far above the crystallised base layer, where the temperature is clearly above the devitrification temperature. Due to the position of the upper edge 4.1 there is no danger of the coring products 3.3 reaching the sleeve 4 and impair the quality of the removed-glass melt.

Figure 2:
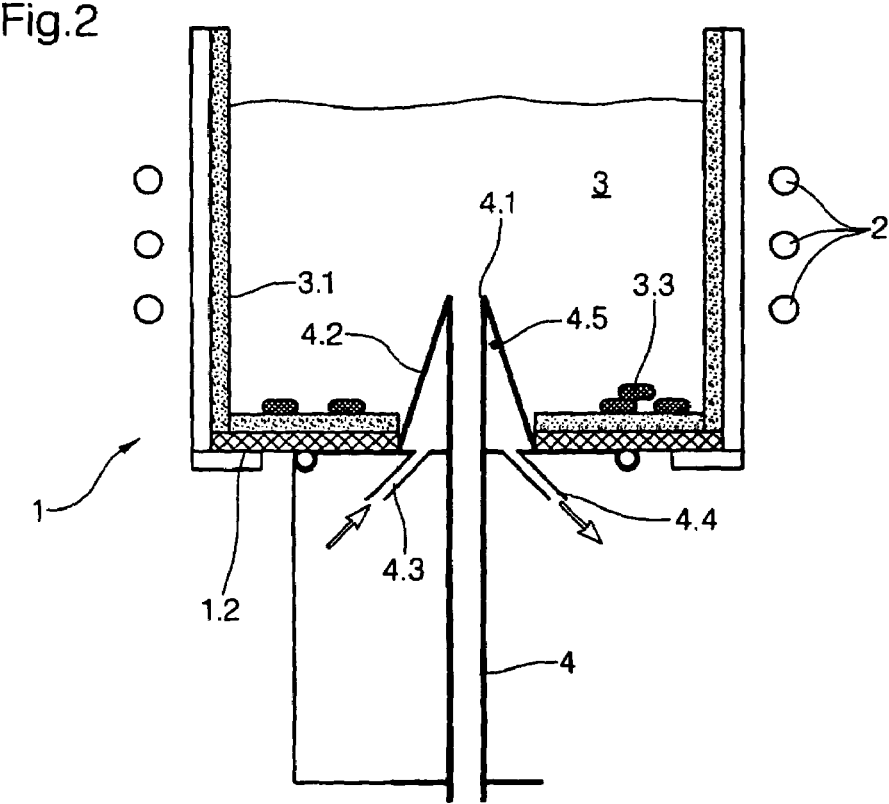
FIG. 2 illustrates a skull crucible according to the second variant in a diagrammatic vertical section.

The skull crucible 1 according to FIG. 2 is fundamentally of the same structure as that according to FIG. 1. It too has a sleeve 4 for removing glass melt. The upper edge 4.1 of the sleeve 4 is again located in a relatively hot area of the glass melt.

Compared to the embodiment of FIG. 1 however a cooling system is provided which is assigned to that area of the sleeve 4 located inside the melt 3. This cooling system exhibits a mantle 4.2 which encloses the upper area of the sleeve 4. Formed between mantle 4.2 and the upper area of the sleeve 4 consequently is a cavity which has an inlet 4.3 and an outlet 4.4. Attached to the inlet 4.3 is a coolant, such as a gas. A thermoelement 4.5 is provided in the cavity.

When the skull crucible is operating it is generally effective to regulate the temperature of that part of the sleeve projecting into the melt 3 such that the temperature of the sleeve 4 is kept low during the melting phase. At the same time the temperature should be low enough to allow a solid glass or crystal layer to form, and when the melt is being drawn off the value of the temperature is raised above the upper devitrification point.

It can also be effective to keep the base region of the skull crucible at a temperature level lower than the superjacent glass melt. The advantage here is that there is less corrosion of the base.

What is claimed is:

1. A skull crucible for melting or refining inorganic substances, in particular glass or glass ceramics, the crucible comprising:
   a crucible wall;
   a crucible base cooperating with said crucible wall to form an inner chamber;
   an induction coil surrounding the crucible wall and via which high frequency-energy is coupled to contents of the crucible;
   wherein the crucible wall is formed from a crown of metal tubes which can be connected to a coolant, with slotted interstices between adjacent metal tubes;
   the base has a run-off for the melt;
   a sleeve is assigned to the run-off and defines an inlet end;
   the inlet end of the sleeve protrudes into the inner chamber of the skull crucible so that the inorganic melt can be removed through a crystallized layer of the inorganic melt formed on the base in a controlled manner without the danger of impairing its quality; and
   a temperature regulating device assigned to the sleeve and selectively adjusting the temperature of the sleeve such that the temperature of the sleeve is lowered during melting and raised during run-off of the melt.

2. A skull crucible as claimed in claim 1, characterized in that the upper edge of the sleeve is at a height of between a tenth to a half of the melt height measured from the base of the crucible.

3. A skull crucible as claimed in claim 1, characterized in that an upper area of the sleeve projecting into the melt and forming a cavity is double-walled, and in that the cavity has an inlet and an outlet for a coolant.

4. A skull crucible as claimed in claim 3, characterized by the following features:
   the sleeve has two coaxial sleeves;
   the outer sleeve is a metal jacket;
   the inner sleeve is a quartz glass tube.

5. A skull crucible as claimed in claim 3, characterized in that the sleeve is height-adjustable.

6. A skull crucible as claimed in claim 1, characterized by the following features:
   the sleeve has two coaxial sleeves including an outer sleeve and an inner sleeve;
   the outer sleeve is a metal jacket;
   the inner sleeve is a quartz glass tube.

7. A skull crucible as claimed in claim 6, characterized in that the sleeve is height-adjustable.

8. A skull crucible as claimed in claim 1, characterized in that the sleeve is height-adjustable.

9. A skull crucible as claimed in claim 1, characterized in that the sleeve is made from a noble metal.

10. A skull crucible as claimed in claim 9, characterized in that the noble metal of the sleeve is platinum or a platinum alloy.

11. A skull crucible for melting or refining inorganic substances, in particular glass or glass ceramics, the crucible comprising:
    a crucible wall;
    a crucible base cooperating with said crucible wall to form an inner chamber;
    an induction coil surrounding the crucible wall and via which high frequency-energy is coupled to contents of the crucible;
    wherein the crucible wall is formed from a crown of metal tubes which can be connected to a coolant, with slotted interstices between adjacent metal tubes, the base has a run-off for the melt, and a sleeve is assigned to the run-off and defines an inlet end, the inlet end of the sleeve protrudes into the inner chamber of the skull crucible so that the inorganic melt can be removed through a crystallized layer of the inorganic melt formed on the base in a controlled manner without the danger of impairing its quality, the sleeve has two coaxial sleeves including an inner and outer sleeve, the outer sleeve is a metal jacket, and the inner sleeve is a quartz glass tube.

12. A skull crucible as claimed in claim 11, characterized in that the sleeve is assigned a temperature regulating device for adjusting the temperature of the sleeve.

13. A skull crucible as claimed in claim 11, characterized in that the sleeve is height-adjustable.

14. A skull crucible as claimed in claim 11 characterized in that an upper area of the sleeve projecting into the melt and forming a cavity is double-walled, and in that the cavity has an inlet and an outlet for a coolant.

15. A skull crucible as claimed in claim 11, characterized in that the sleeve is made from a noble metal.

16. A method for melting or refining inorganic substances, in particular glass or glass ceramics, the method comprising:
    melting the inorganic substances in an inner chamber of a skull crucible having a crucible wall and a crucible base, the crucible base comprising a run-off for the melt to which a sleeve is assigned;
    cooling the sleeve during melting such that a crystallized layer of the inorganic substances is developed on the sleeve to protect the sleeve from corrosion by the melted inorganic substances; and
    raising the sleeve to allow removal of the melt.

17. The method of claim 16 wherein the sleeve is made from a noble metal.

18. The method of claim 16 wherein the noble metal is platinum or a platinum alloy.

* * * * *